(12) United States Patent
Rougier et al.

(10) Patent No.: US 10,275,551 B2
(45) Date of Patent: Apr. 30, 2019

(54) INTEGRATED SOLVER FOR FLUID DRIVEN FRACTURE AND FRAGMENTATION

(71) Applicant: Triad National Security, LLC, Los Alamos, NM (US)

(72) Inventors: Esteban Rougier, Los Alamos, NM (US); Earl Eugene Knight, Rio Rancho, NM (US); Antonio Munjiza, London (GB)

(73) Assignee: Triad National Security, LLC, Los Alamos, NM (US)

( * ) Notice: Subject to any disclaimer, the term of this patent is extended or adjusted under 35 U.S.C. 154(b) by 957 days.

(21) Appl. No.: 14/339,760

(22) Filed: Jul. 24, 2014

(65) Prior Publication Data

US 2015/0032427 A1  Jan. 29, 2015

Related U.S. Application Data

(60) Provisional application No. 61/859,130, filed on Jul. 26, 2013.

(51) Int. Cl.
*G06F 17/50* (2006.01)
*E21B 43/26* (2006.01)

(52) U.S. Cl.
CPC .......... *G06F 17/5018* (2013.01); *E21B 43/26* (2013.01); *G06F 2217/16* (2013.01)

(58) Field of Classification Search
None
See application file for complete search history.

(56) References Cited

U.S. PATENT DOCUMENTS

| 2011/0166843 | A1* | 7/2011 | Hsu ........................ | G01V 11/00 703/10 |
| 2012/0318500 | A1* | 12/2012 | Urbancic ................ | E21B 43/26 166/250.1 |
| 2013/0096890 | A1* | 4/2013 | Vanderheyden .... | G06F 17/5009 703/2 |

* cited by examiner

*Primary Examiner* — Craig C Dorais
(74) *Attorney, Agent, or Firm* — LeonardPatel PC (57) ABSTRACT

An integrated solver may be used for both a fluid phase and a solid phase. The integrated solver may use constitutive equations for the fluid phase and the solid phase, and calculate the stress in the fluid and solid using the same integration point. The integrated solver may also calculate other state variables using the same integration point.

20 Claims, 12 Drawing Sheets

INTEGRATED SOLVER FOR FLUID DRIVEN FRACTURE AND FRAGMENTATION

CROSS REFERENCE TO RELATED APPLICATION

This application claims the benefit of U.S. Provisional Application Ser. No. 61/859,130, filed on Jul. 26, 2013. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention relates to an integrated solver, and more specifically, to an integrated solver configured to be used for both fluid and solid phases.

BACKGROUND

To model numerically fluid driven fracture and fragmentation processes, it is currently necessary to separately model the solid phase and the fluid phase (single-phase flow or multi-phase flow), as well as model the interaction between the solid and fluid phases. A number of approaches based on coupling of separate fluid and solid solvers are conventionally available. These approaches solve solid phases and fluid phases separately and couple the solid and fluid phases through transfer of momentum, energy, force, and other variables at a nodal level. For example, a mechanics code that handles the solid material is coupled to a fluid code, allowing each code to communicate with the other. However, the coupling approach can be time exhaustive and may result in numeric errors due to the transfer process between the coupled codes.

Thus, a quicker and more accurate approach to numerically modeling fluid driven fracture and fragmentation processes may be beneficial.

SUMMARY

Certain embodiments of the present invention may provide solutions to the problems and needs in the art that have not yet been fully identified, appreciated, or solved by current modeling approaches. For instance, in some embodiments, the integrated solver may be used for both fluid and solid phases. A mechanics code may combine a finite element code with a discrete element code. The fluid may also be integrated into the mechanics code. This allows the fluid to flow across the solid porous media and also along fractures defined by surface elements in the mechanics code, resulting in a congruent time stepping scheme between the solid and the fluid phases and in the elimination of potential errors due to the physical variables' transfer process.

In one embodiment, a computer-implemented process includes calculating, by at least one processor, deformation on each element and each phase of a deformable medium, and calculating, by the at least one processor, stresses on each phase of the deformable medium, based on the calculated deformation. The computer-implemented process also includes mapping, by the at least one processor, the calculated stress on each phase of the deformable medium into corresponding nodal forces of finite elements.

In another embodiment, an apparatus includes at least one processor and memory including a set of instructions. The set of instructions and the at least one processor are configured to cause the apparatus to calculate deformation on each element and each phase of a deformable medium, and calculate stresses on each phase of the deformable medium based on the calculated deformations. The set of instructions and the at least one processor are further configured to cause the apparatus to map the calculated stresses on each phase of the deformable medium into corresponding nodal forces of finite elements.

In yet another embodiment, a computer-implemented process includes calculating, by at least one processor, stresses in a solid from a plurality of nodal displacements and a plurality of nodal velocities. The process also includes calculating, by the at least one processor, stresses in a fluid from the plurality of nodal displacements, the plurality of nodal velocities, the amount of fluid inside the pores of the solid, and a micro-mechanical interaction between the solid and fluid phases.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

The integrated solid fluid solver (hereinafter "integrated solver") of some embodiments may be used for both solid and fluid phases. The integrated solver may be a multiphase solver, where the solid phase is just one of the solved phases. At the integration point level, constitutive equations for each of the phases may be employed and stresses and other state variables may be calculated. This way, the total stress at any point is a priori and naturally separated into stress in the solid phase and stress in the fluid phase, with the solid and fluid phases interacting at a microstructural level. For instance, the solid may pressurize the fluid and the fluid may stretch the solid.

For other state variables, the same process may be executed. This way, there is no "transfer of variables" between solid and fluid phases. There is, however, a total stress (constituted by the sum of the stresses in the solid and fluid phases), which can produce nodal forces in the nodes of the finite element mesh.

In certain embodiments, a combined finite-discrete element method solver for the solid phase may be integrated with a finite volume method solver for the fluid phase. The combined finite-discrete element method, with its explicit handling of the fracture processes, provides a natural framework for the integration of a fluid solver on top of the same mesh. The explicitly described fractures provide a pathway for the fluid to flow along. In addition, the fluid solver has the capability to describe the seepage of the fluid in or out of the porous solid medium. The embodiment of this integrated solver, therefore, provides a unique approach to model fluid driven fracture deformation.

Figure 1:
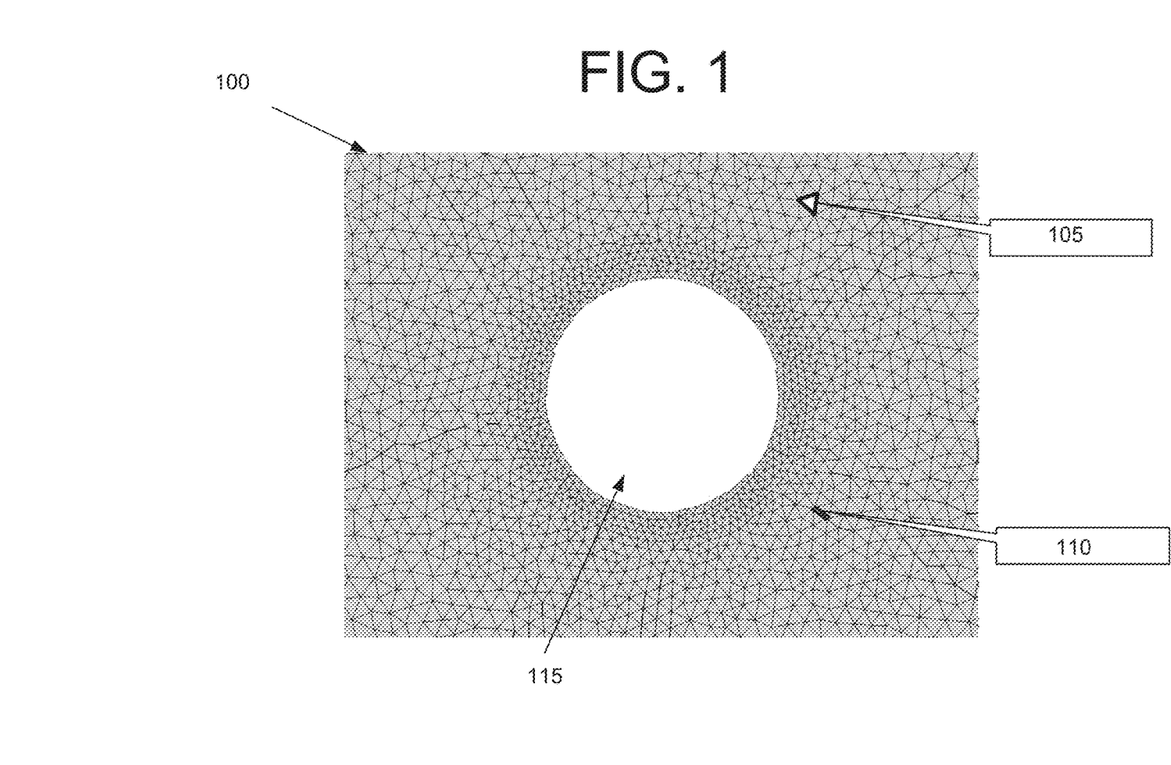
FIG. 1 illustrates a discretized deformable medium, according to an embodiment of the present invention.

FIG. 1 illustrates a discretized deformable medium 100, according to an embodiment of the present invention. In this embodiment, discretized deformable medium 100 is discretized into finite elements, which can be of any shape. A borehole 115 is located at the center of deformable medium 100. In this embodiment, discretized deformable medium 100 may include two types of finite elements—solid elements 105 and surface (or cracks) elements 110. For example, solid elements 105 describe the deformation of deformable medium 100 and also describe how fluid behaves within the porous media of deformable medium 100. Surface elements 110 may describe information with respect to the fracture and fragmentation processes in deformable medium 100 and also describe the flow of fluid along the fractures. This principle can be reproduced using any type of finite elements.

Figure 2A:
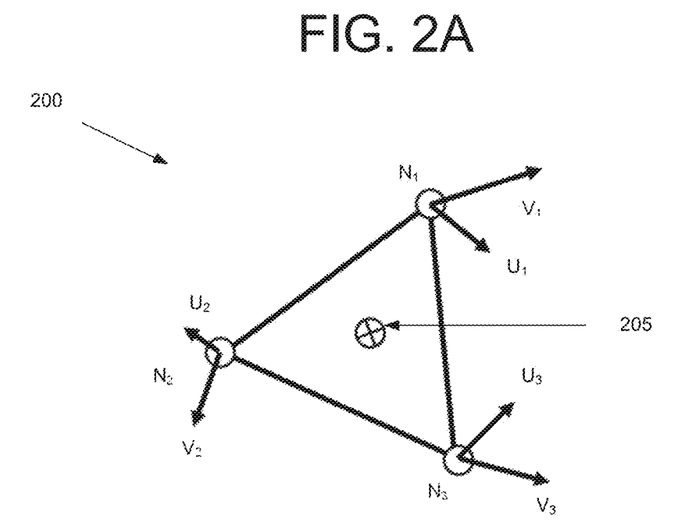
FIG. 2A illustrates a finite element representing solid and fluid being integrated at a material or integration point level, according to an embodiment of the present invention.
Figure 2B:
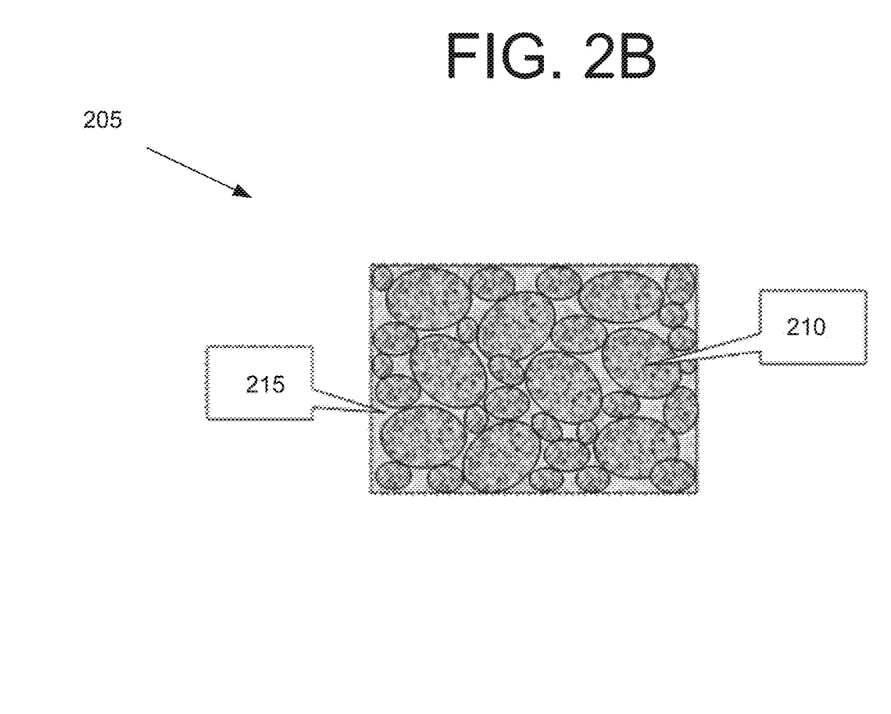
FIG. 2B illustrates a solid-fluid interaction at a microstructural level of an integration point, according to an embodiment of the present invention.

At the level of solid elements 105 (hereinafter the "solid element level"), for example, stresses in discretized deformable medium 100 may be calculated from nodal displacements $U_1$, $U_2$, $U_3$ and nodal velocities $V_1$, $V_2$, $V_3$. See, for example, nodes $N_1$, $N_2$, $N_3$ of FIG. 2A. FIG. 2A shows an integration point 205 for solid/fluid element 200, according to an embodiment of the present invention. Further, at the solid element level, stresses in the fluid may also be calculated from nodal velocities $V_1$, $V_2$, $V_3$ of discretized deformable medium 100, nodal displacements $U_1$, $U_2$, $U_3$ of discretized deformable medium 100, the amount of fluid inside the pores of discretized deformable medium 100, and micromechanical interaction between the solid and the fluid phases within the discretized deformable medium 100. Stated differently, integration point (or Gauss point) 205 can be used to calculate both the stresses in the solid and the stresses in the fluid. See, for example, FIG. 2B, which illustrates interaction between solid 210 and fluid 215 at micro-structural level 205.

Figure 3:
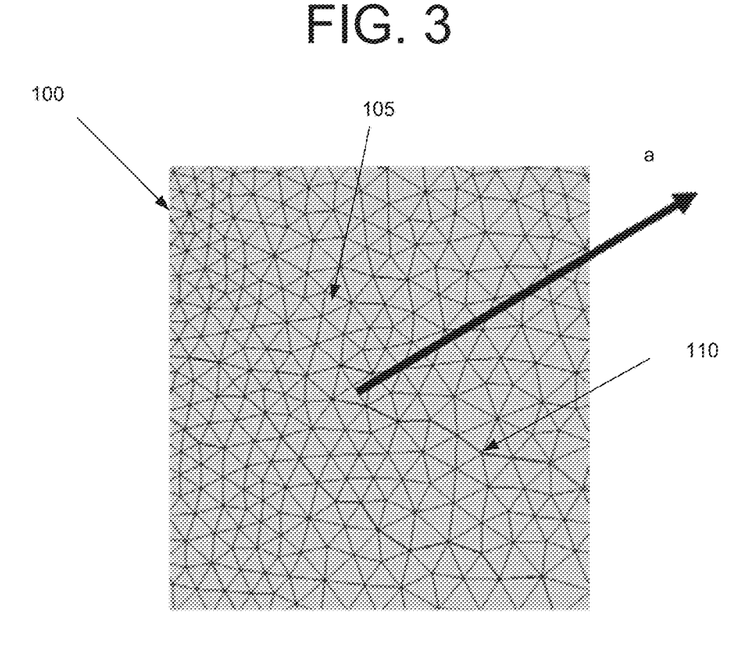
FIG. 3 illustrates a representative interaction between the solid and fluid, according to an embodiment of the present invention.

In certain embodiments, as discretized deformable medium 100 deforms and/or accelerates (see FIG. 3, acceleration a), the solid phases of discretized deformable medium 100 interact with the fluid phases at a micromechanical (e.g., the integration point) level, dragging the fluid phases with them. In other words, the interaction causes the fluid to move with discretized deformable medium 100 and through the pores of discretized deformable medium 100. In a sense, the grid of discretized deformable medium 100 may act as a non-inertial grid, which is neither Lagrangian nor Eulerian, for fluid flow formulation. See, for example, FIG. 3, which shows the interaction between solid element 105 and the fluid at the integration point level. Any acceleration, a, imparted to the discretized deformable medium 100 is transferred to the fluid contained within it.

By using surface elements 110, fracture and fragmentation in discretized deformable medium 100 may be modeled through a concept of localization, or localized failure, often called the combined single and smeared crack model. Thus, surface elements 110 may play a key role in solid phase modeling. It should be appreciated that the same elements may also play a key role in the fluid phase modeling.

As the fluid flows through the localized failing (e.g., fracturing or fragmenting) solid, a standard finite volume formulation may be used to describe this flow. However, the interaction between the fluid and the solid occurs at the micro-mechanical level. In other words, the solid "drags" the fluid with it, and, in return, the fluid flows through the fractures. This way, solid element 105 and surface element 110 act as non-inertial frames for the fluid. Therefore, neither an Eulerian nor a Lagrangian formulation is used, but rather a non-inertial frame base formulation. The non-inertial frame base formulation allows for the interaction to occur at the micro-mechanical level (e.g., Gauss point) rather than at the nodal level.

Figure 4:
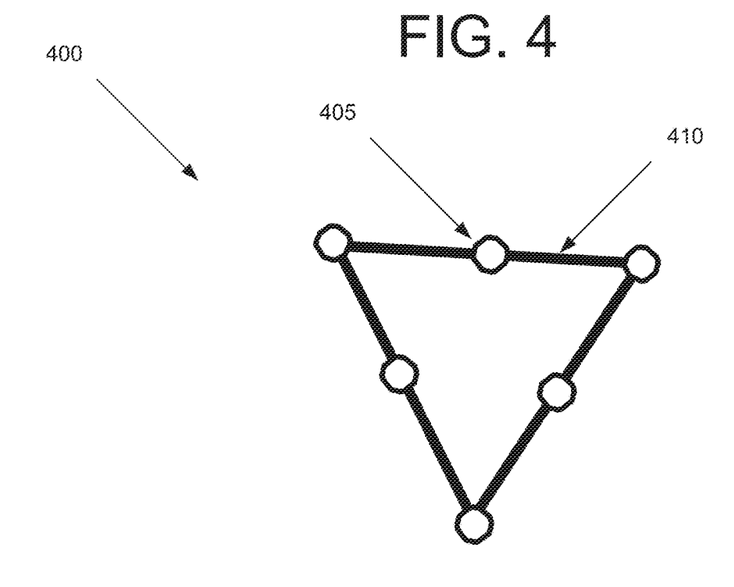
FIG. 4 illustrates a generic solid element in 2-dimensions, according to an embodiment of the present invention.

FIG. 4 illustrates a generic solid element 400 in 2-dimensions, according to an embodiment of the present invention. Stated differently, in 2-dimensions, solid elements can be triangles or any other element from a finite element library. It should be appreciated that other shapes in 2-dimensions and in 3-dimensions can also be utilized using the same principle. In this embodiment, circles 405 are nodes and lines 410 are edges of the solid element.

Figure 5:
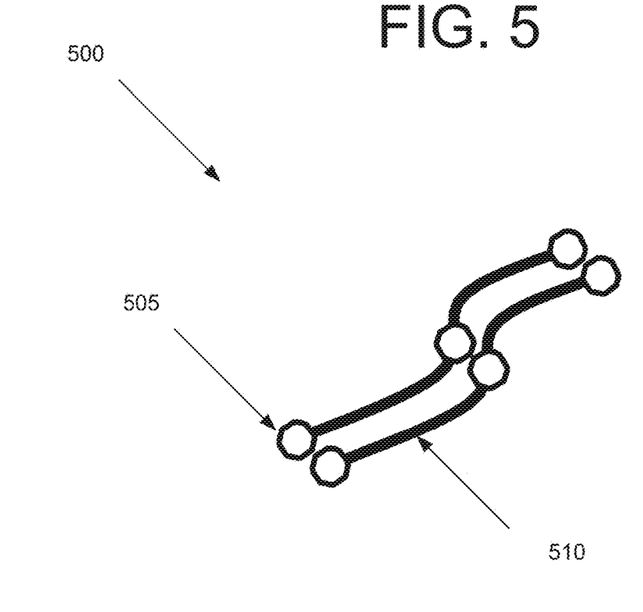
FIG. 5 illustrates a generic surface element in 2-dimensions, according to an embodiment of the present invention.

FIG. 5 illustrates a generic surface element 500 in 2-dimensions, according to an embodiment of the present invention. Stated differently, in 2-dimensions, surface elements may have two nodes, three nodes, straight lines, curves, etc. Other elements based on a similar principle can also be used in 2-dimensions and in 3-dimensions. Circles 505 are nodes and lines 510 are edges in the surface element.

Figure 6:
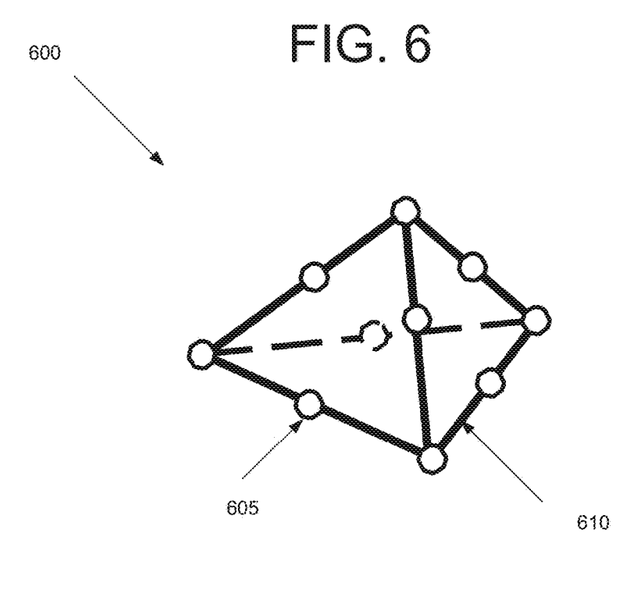
FIG. 6 illustrates a generic solid element in 3-dimensions, according to an embodiment of the present invention.

FIG. 6 illustrates a generic solid element 600 in 3 dimensions, according to an embodiment of the present invention. Stated differently, in 3-dimensions, solid elements can be tetrahedrons or other elements from the finite element library. Other elements based on a similar principle can also be used in 2-dimensions and in 3-dimensions. Circles 605 are nodes and lines 610 are edges in the surface element.

Figure 7:
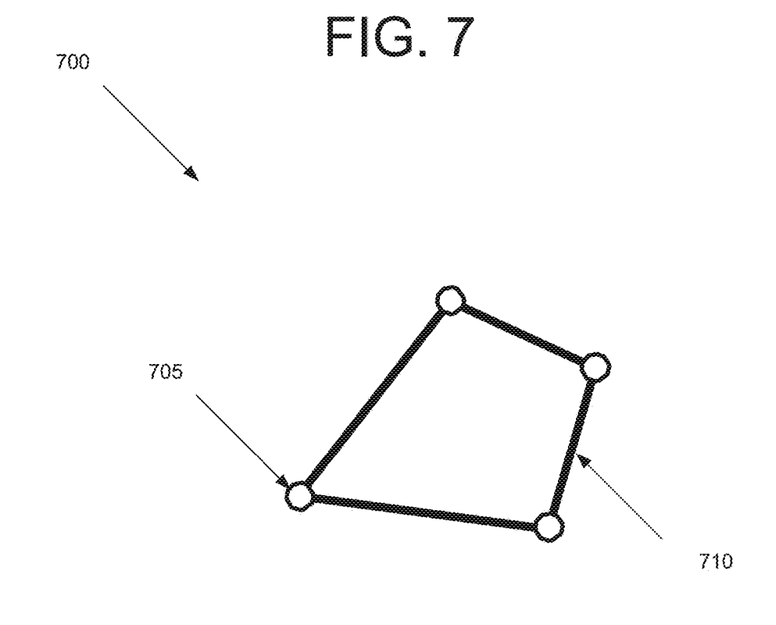
FIG. 7 illustrates a generic surface element in 3-dimensions, according to an embodiment of the present invention.

FIG. 7 illustrates a generic surface element 700 in 3-dimensions, according to an embodiment of the present invention. Stated differently, in 3-dimensions, surface elements can be triangles or other types of elements. Other elements based on a similar principle can also be used in 2-dimensions and in 3-dimensions. Circles 705 are nodes and lines 710 are edges in the surface element.

Figure 8:
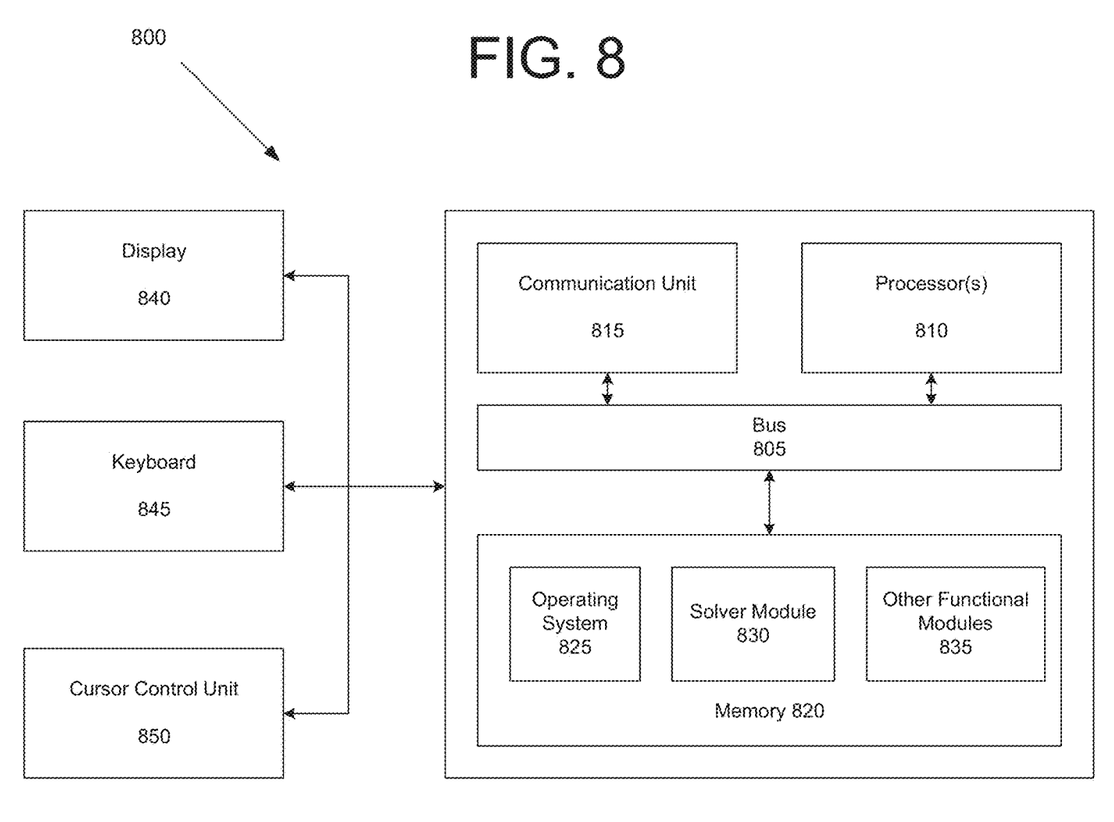
FIG. 8 is a block diagram of a computing system, according to an embodiment of the present invention.

FIG. 8 is a block diagram 800 of a computing system, according to an embodiment of the present invention. Computing system 800 may include a bus 805 or other communication mechanism that can communicate information and at least one processor 810. At least one processor 810, coupled to bus 805, can process information, and can be any type of general or specific purpose processor. Computing system 800 may also include memory 820 that can store information and instructions to be executed by at least one processor 810. Memory 820 can be comprised of any combination of random access memory ("RAM"), read only memory ("ROM"), static storage such as a magnetic or optical disk, or any other type of non-transitory computer readable medium. Computing system 800 may also include a communication device 815, such as a network interface card, that may provide access to a network.

The non-transitory computer readable medium may be any available media that can be accessed by at least one processor 810. The computer readable medium may include both volatile and nonvolatile media, removable and non-removable media, and communication media. The communication media may include computer readable instructions, data structures, program modules, or other data and may include any information delivery media.

At least one processor 810 can also be coupled via bus 805 to a display 840, such as a Liquid Crystal Display ("LCD"). Display 840 may display information to the user, such as information resulting from the integrated solid fluid solver. A keyboard 845 and a cursor control unit 850, such as a computer mouse, may also be coupled to bus 805 to enable the user to interface with system 800.

According to one embodiment, memory 820 may store software modules that may provide functionality when executed by at least one processor 810. The modules can include an operating system 825 and an integrated solver module 830, as well as other functional modules 835. Operating system 825 may provide operating system functionality for computing system 800. Because computing system 800 may be part of a larger system, computing system 800 may include one or more additional functional modules 835 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 9:
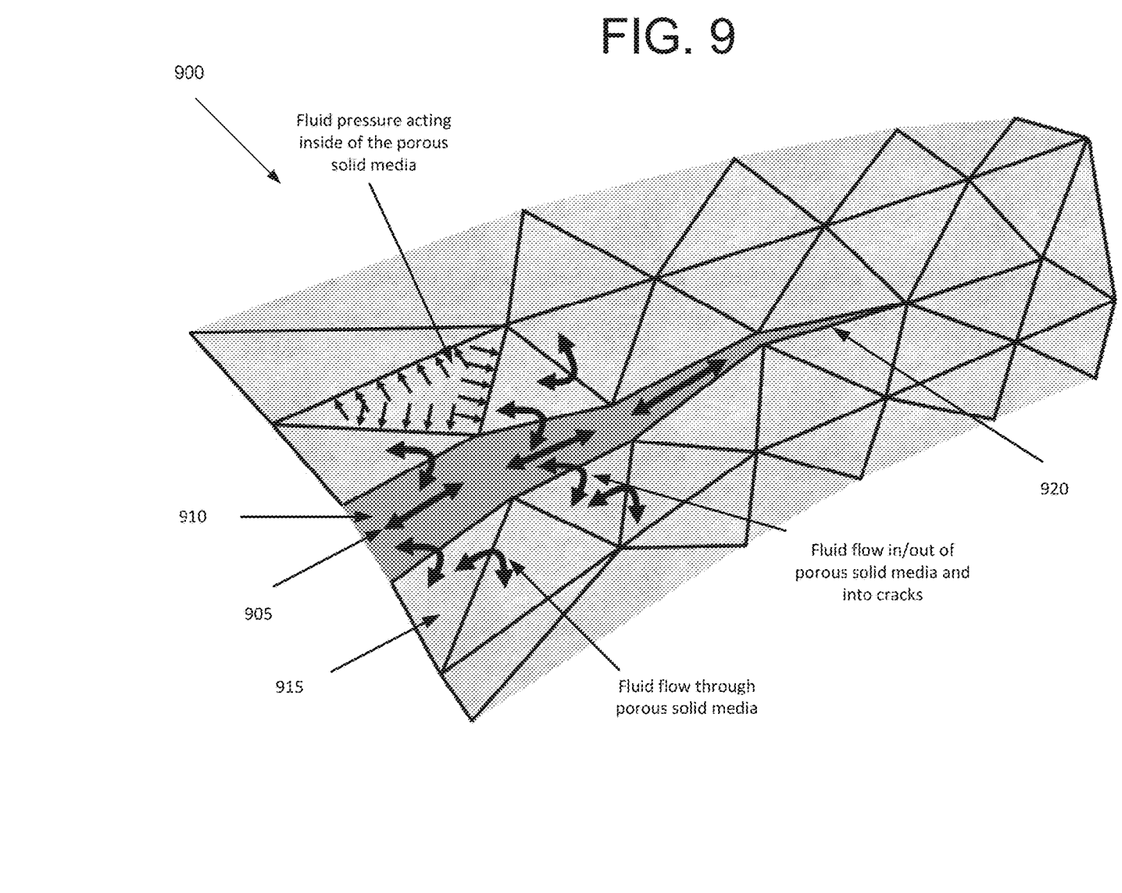
FIG. 9 illustrates fluid flow along fractures and through porous solid media, according to an embodiment of the present invention.

FIG. 9 illustrates a deformable medium 900 having a fluid flow 905 along fractures 910 and through porous solid media 915, according to an embodiment of the present invention. In this embodiment, fluid flow 905 along fractures 910 is reduced to a 2.5-dimensional manifold flow for a 3-dimensional problem. In another embodiment, fluid flow 905 is reduced to a 1.5-dimensional manifold flow for a 2-dimensional problem. Fracture walls 920 act as the boundary for the manifold.

Fluid flow 905 is modelled using the same grid utilized to describe the solid deformation, thus the name integrated solid fluid solver. In this embodiment, fluid flow 905 from fractures 910 and into porous solid media 915 is allowed via a phenomena called "caking". Also, in this embodiment, fluid flow 905 from porous solid media 915 and into fracture 910 may also be allowed. In both instances, the boundary between porous solid media 915 and fracture 910 is defined by fracture walls 920. It should be appreciated that the boundary may be changing its fluid permeability as the simulation progresses.

Fluid flow 905 inside deformable medium 900 can be described as a single phase, or as a multiphase fluid flow, contained within the pores of porous solid media 915. This fluid may interact with porous solid media 915 at the microstructure level. In other words, the pressure from the fluid causes the fluid to compress the microstructural grains of porous solid media 915, while expanding the microstructural voids.

With surface friction caused by the fluid, a drag is produced on porous solid media 915. The fluid may also add to the inertia and the mass of porous solid media 915. Inside a single cell of the grid, the deformation of porous solid media 915 and the fluid are considered at the same material point and using material laws the stresses for both solid and fluid phases are obtained. This way, non-Newtonian fluids, reacting fluids, proppants, and explosive mixtures can be naturally represented within the integrated solid fluid, or ISF.

Interaction of porous solid media 915 and fluid is described at the material point level. For example, fluid compresses individual microelements (grains) of porous solid media 915. Forces on cell nodes are then obtained by integration over the cell of both solid and fluid phase stresses.

Figure 10:
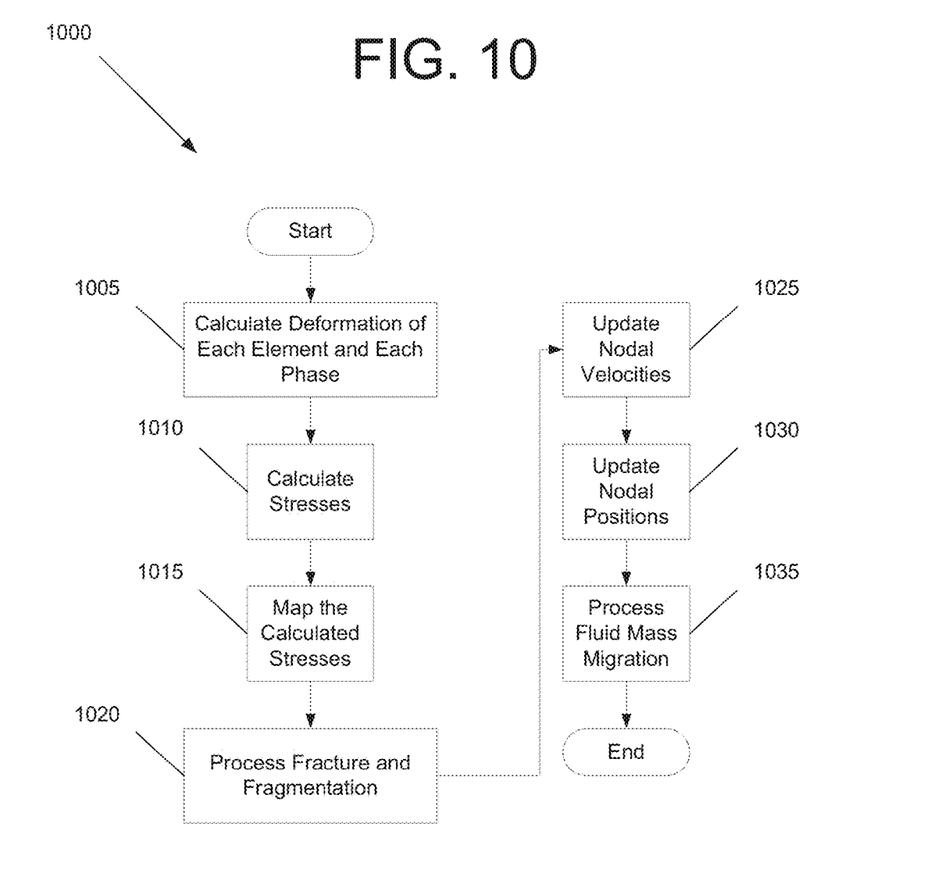
FIGS. 10 and 11 are flow diagrams illustrating an integrated solver process, according to an embodiment of the present invention.

FIG. 10 is a flow diagram 1000 illustrating a process for an integrated solver, according to an embodiment of the present invention. In this embodiment, the process of FIG. 10 may be executed by computing system 800 of FIG. 8. In certain embodiments, the process for the integrated solver is an explicit time integration type of solver. Stated differently, provided a given size of time step, the process may iteratively calculate the response of a deformable system by calculating forces, accelerations, velocities and positions of the nodes of the mesh at the end of each time step.

In one embodiment, the process may begin at 1005 by calculating the deformation for each finite element and for each phase (i.e., solid and fluid). At 1010, the stresses for the fluid and solid phases are calculated based on the calculated deformation. At 1015, the calculated stresses of the fluid and the solid phases are mapped into corresponding nodal forces of the finite elements.

At 1020, the fracture and fragmentation of the solid finite elements are processed. At 1025, the nodal velocities are updated, and, at 1030, the nodal positions are updated. Based on the new fracture pattern and deformation level, fluid mass migration is processed across the domain at 1035.

Figure 11:
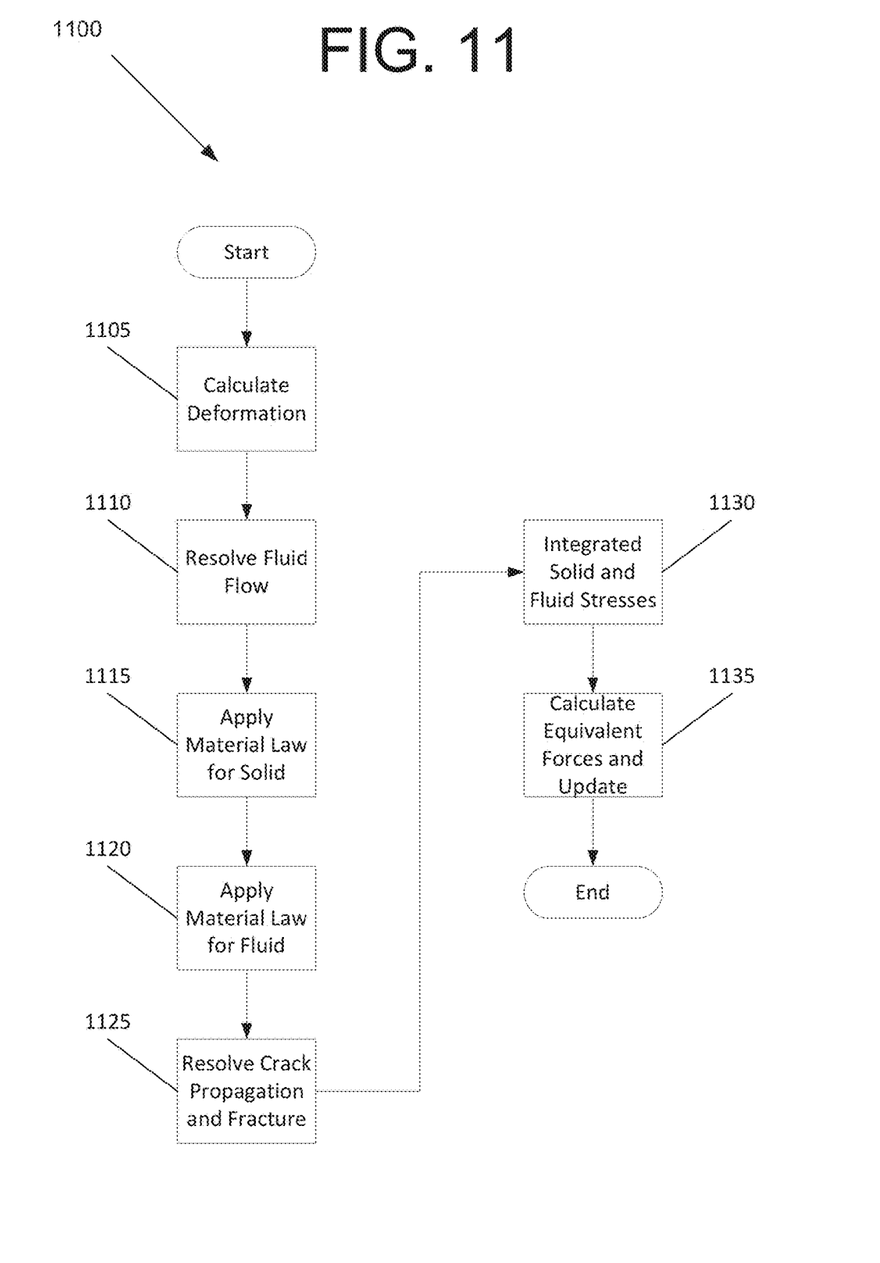

FIG. 11 is a flow diagram 1100 illustrating a process for an integrated solver, according to an embodiment of the present invention. In this embodiment, the process of FIG. 11 may be executed by computing system 800 of FIG. 8.

In one embodiment, the process begins at 1105 by calculating deformation of each element and each phase. It should be appreciated that any standard formulation for solid deformation can be implemented. For example a standard formulation may include a finite element formulation for solid. This may include large strain-large displacement formulation together with any fracture model. Deformation of the fluid in this embodiment is obtained from mass conservation, deformation of the solid, and any chemical reactions processes.

At 1110, fluid flow through fractures and porous media is resolved. This may be accomplished by calculating fluid flow using the same grid as for solid deformation. The actual formulation may be any standard fluid flow formulation, e.g., the finite volume formulation. Fluid flow is described through the fracture manifold and through the pore space.

At 1115, material law for solid is applied. It should be appreciated that any material law from a material package can be considered. At 1120, the material law for fluid is applied. It should be appreciated that any equation of state for fluid can be implemented, including chemical reactions.

At 1125, crack propagation and fracture is resolved. In this embodiment, a combined smear crack approach of the combined finite discrete element method may be applied. However, other approaches may be applied as would be readily appreciated by a person of ordinary skill in the art.

At 1130, solid and fluid stresses are integrated. Interaction between solid and fluid is considered at the micro-structure level with stresses for both the solid and fluid being calculated at the same material point. It should be noted, however, that separate material laws are used for solid and for fluid.

At 1135, equivalent nodal forces are calculated and displacements are updated using, for example, a finite element formulation or a combined finite discrete element formulation. Other alternative formulations may also be used.

It should be appreciated that the steps shown in FIGS. 10 and 11 may be performed, in part, by a computer program, encoding instructions for a nonlinear adaptive processor to cause at least the process described in FIGS. 10 and 11 to be performed iteratively by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 10 and 11, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit (ASIC).

The solid elements, in certain embodiments, pertain to both bulk solid and bulk fluid together with their micro-mechanical interactions at the integration point level. This approach allows for elaborate material formulations for both solid and fluid phases, each of which has a separate formulation, maintaining the two phases as separate entities and interacting at the micro-mechanical level, which scales up through Gauss points or equivalent numerical integration points. In other words, the material formulation is micro-mechanical, while the solver is for industrial scale macro-applications.

The surface elements in certain embodiments pertain to fluid inside a fracture, while at the same time describing localized straining, i.e. fracture and fragmentation, in the solid. Again, both for solid and fluid, any suitable solvers can be employed. However, when these solvers are integrated at the micro-mechanical level through, for instance, Gauss points, the integrated solver is obtained.

Attributes of the integrated solver include, but are not limited to, (1) no separate grids (discretizations) for different phases; (2) non-inertial grid elements for fluid phases (as opposed to Lagrangian or Eulerian formulations); (3) separate constitutive laws for different phases; (4) micro-mechanical level integration of different phases; (5) multi-scaling from micro-mechanical to macro-level through integration points; and (6) handling of all flow regimes for the fluid, i.e., laminar, turbulent, potential, subsonic, supersonic, single-phase, multi-phase, Newtonian, non-Newtonian, etc.

The application for the solver may be hydraulic fracturing simulations of enhanced oil recovery or geothermal systems (EGS), wellbore stability and fracture network creation, hydraulic fracture induced seismicity analysis, mining operations for blasting in surface and underground mines, surface subsidence analysis due to blasting operations, high explosive device modeling for subsurface damage analysis, penetration mechanics analysis for explosive events, penetration into brittle materials, carbon sequestration bedrock analysis, and gravity dam stability analysis, among others.

Thus, some embodiments of the present invention pertain to an integrated solver for a fluid phase and solid phase using the same grid. In certain embodiments, a control volume based fluid solver is superimposed onto a solid solver. This way, the fluid solver uses a non-inertial frame rather than an Eulerian or Lagrangian approach.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations that are different than those which are disclosed. Therefore, although the invention has been described based upon these embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process, comprising:
    calculating, by at least one processor, deformation on each element and each phase of a deformable medium with a fluid flow along fractures and through porous solid media, wherein each phase comprises a solid phase and a fluid phase;
    calculating, by the at least one processor, a stress on each phase of the deformable medium based on the calculated deformation; and
    mapping, by the at least one processor, the calculated stress on each phase of the deformable medium into corresponding nodal force of finite elements to numerically model fluid driven fracture and fragmentation, wherein
    each element of the deformable medium comprises a solid element pertaining to bulk solid and bulk fluid, both of which have micromechanical interactions at an integration point level.

2. The computer-implemented process of claim 1, wherein each element of the deformable medium comprises a surface element, the solid element, or both.

3. The computer-implemented process of claim 1, wherein the fluid phase comprises a single fluid phase or multiple fluid phases, and the solid phase comprises a single solid phase or multiple solid phases.

4. The computer-implemented process of claim 1, wherein the calculating of the stress on each phase of the deformable medium comprises determining, by at least one processor, an interaction between the solid and fluid phases at a micro-structure level.

5. The computer-implemented process of claim 1, further comprising:
    calculating, by the at least one processor, the nodal forces using at least one nodal velocity, at least one nodal position, or both.

6. The computer-implemented process of claim 5, further comprising:
    updating, by the at least one processor, the at least one nodal velocity.

7. The computer-implemented process of claim 5, further comprising:
    updating, by the at least one processor, the at least one nodal position.

8. An apparatus, comprising:
    at least one processor; and
    memory comprising a set of instructions, wherein
    the set of instructions and the at least one processor are configured to cause the apparatus to
        calculate deformation on each element and each phase of the deformable medium with a fluid flow along fractures and through porous solid media, wherein each phase comprises a solid phase and a fluid phase;
        calculate stresses on each phase of the deformable medium based on the calculated deformation; and
        map the calculated stresses on each phase of the deformable medium into corresponding nodal forces of finite elements to numerically model fluid driven fracture and fragmentation, wherein
        each element of the deformable medium comprises a solid element pertaining to bulk solid and bulk fluid, both of which have micromechanical interactions at an integration point level.

9. The apparatus of claim 8, wherein each element of the deformable medium comprises a surface element, the solid element, or both.

10. The apparatus of claim 8, wherein each phase of the deformable medium comprises a fluid phase, solid phase, or both.

11. The apparatus of claim 10, wherein the set of instructions and the at least one processor are further configured to cause the apparatus to determine an interaction between the solid phase and fluid phase at a micro-structure level.

12. The apparatus of claim 8, wherein the set of instructions and the at least one processor are further configured to cause the apparatus to calculate the nodal forces using at least one nodal velocity, at least one nodal position, or both.

13. The apparatus of claim 12, wherein the set of instructions and the at least one processor are configured to cause the apparatus to update the at least one nodal velocity.

14. The apparatus of claim 12, wherein the set of instructions and the at least one processor are configured to cause the apparatus to update the at least one nodal position.

15. A computer-implemented process, comprising:
    calculating, by at least one processor, stresses in a discretized deformable medium having discretized finite elements of any shape, the stresses are calculated at a solid element level from a plurality of nodal displacements and a plurality of velocities; and calculating, by the at least one processor, stresses in fluid, the stresses are calculated at the solid element level from the plurality of nodal displacements, the plurality of nodal velocities, amount of fluid inside of pores of the solid, and a micro-mechanical interaction between solid and fluid phases to numerically model fluid driven fracture and fragmentation, wherein each element of the deformable medium comprises a solid element pertaining to bulk solid and bulk fluid, both of which have micromechanical interactions at an integration point level.

16. The computer-implemented process of claim 15, wherein the calculating of the stresses in the solid is performed at a solid element level using solid phases.

17. The computer-implemented process of claim 15, wherein the calculating of the stresses in the fluid is performed at a solid element level using fluid phases.

18. The computer-implemented process of claim 15, wherein an integration point is used to calculate the stresses in the solid.

19. The computer-implemented process of claim 15, wherein an integration point is used to calculate the stresses in the fluid.

20. The computer-implemented process of claim 15, wherein a same integration point is used to calculate stresses in the solid and in the fluid phases.

\* \* \* \* \*